(12) United States Patent
Solliday

(10) Patent No.: US 10,010,956 B2
(45) Date of Patent: Jul. 3, 2018

(54) FIREFIGHTER'S APPLIANCE

(71) Applicant: Paul A. Solliday, Port Huron, MI (US)

(72) Inventor: Paul A. Solliday, Port Huron, MI (US)

( * ) Notice: Subject to any disclaimer, the term of this patent is extended or adjusted under 35 U.S.C. 154(b) by 555 days.

(21) Appl. No.: 14/148,803

(22) Filed: Jan. 7, 2014

(65) Prior Publication Data

US 2015/0190661 A1    Jul. 9, 2015

(51) Int. Cl.
*B23D 57/02* (2006.01)
*A62B 7/02* (2006.01)
*A62B 3/00* (2006.01)

(52) U.S. Cl.
CPC .............. *B23D 57/023* (2013.01); *A62B 7/02* (2013.01); *A62B 3/005* (2013.01)

(58) Field of Classification Search
CPC .. A62B 7/12; A62B 7/02; A62B 9/022; A62B 9/04; A62B 3/005; A62B 18/025; A62B 18/082; A62B 18/084; A62B 7/04; A62B 9/00; A62B 9/02; A62C 8/00; B23D 57/023; F02M 25/10; F02M 21/0281; F02M 2700/1305; F02M 23/00; F02M 23/003; F02M 23/02; F02M 23/08; Y02T 10/121; B63C 11/18; B63C 11/186; B63C 11/22; B63C 11/2236; Y10T 137/877; Y10T 137/87877

USPC ... 123/198 E, 198 R, 184.21, 585, 568, 567, 123/588; 128/202.13, 201.27, 201.28, 128/201.29, 202.27, 204.18, 204.26, 128/205.11, 205.22, 205.24, 205.25, 128/206.28, 207.18; 137/861, 883; 251/149.4, 324

See application file for complete search history.

(56) References Cited

U.S. PATENT DOCUMENTS

| | | | | |
|---|---|---|---|---|
| 4,300,496 A | * | 11/1981 | Price .................... | A62B 3/005 123/198 E |
| 6,966,317 B2 | * | 11/2005 | Bardel ................ | A62B 18/025 128/204.26 |
| 2009/0100689 A1 | * | 4/2009 | Shimokawa ........ | B27B 17/0033 30/381 |
| 2010/0224193 A1 | * | 9/2010 | Teetzel .................... | A62B 7/10 128/205.12 |

* cited by examiner

*Primary Examiner* — Todd J Scherbel
*Assistant Examiner* — Elliot S Ruddie
(74) *Attorney, Agent, or Firm* — Young Basile Hanlon & MacFarlane, P.C.

(57) ABSTRACT

A system for simultaneously supplying compressed air to the personal breathing apparatus of a firefighter and to an internal combustion engine appliance, such as a chainsaw. The supply of air intake of the chainsaw is provided by means of an adapter which is configured to attach to both the air intake of the chainsaw and to a demand valve-type regulator.

7 Claims, 7 Drawing Sheets

FIREFIGHTER'S APPLIANCE

FIELD OF THE INVENTION

The invention relates to firefighter's appliances and, in a specific embodiment thereof, to a system for simultaneously supplying air to a firefighter's personal breathing apparatus and to an internal combustion driven appliance, such as a chainsaw.

BACKGROUND OF THE INVENTION

Firefighters are often confronted with the need to enter an area which, because of an existing or previous fire, is breathable air-deprived to the point where neither a firefighter nor an internal combustion driven appliance, such as a chainsaw or cutter, can function to full effect. While it is known to supply the firefighter with a personal breathing apparatus fed by a tank of compressed air, a tool such as a chain saw or circular saw, when needed, is left to run at reduced horsepower, if at all, on whatever air or oxygen is left in the area that the firefighter has entered.

Appliances such as chainsaws and cutters are often needed to clear debris or provide either or both of ingress and egress to/from an active area for one or more firefighters. A poorly functioning or non-functioning appliance or tool may be a significant liability to the firefighter's effectiveness and/or safety.

BRIEF DESCRIPTION OF THE INVENTION

According to one aspect of the invention, a firefighter's operational system provides air to a personal breathing device worn by the firefighter while, at the same time, providing supplemental air to the internal combustion engine of an appliance such as a chainsaw.

In general, this system comprises a hand-carried tool or appliance driven by an internal combustion engine having an air intake, a breathing device adapted to supply breathable air to a working firefighter, a compressed air source such as a backpack tank, and first and second supply conduits, both adapted to receive air from the tank, the first conduit being connected to the air intake of the internal combustion engine through an adapter and a demand valve and the second conduit being connected to the firefighter's breathing apparatus.

In accordance with a second aspect of the invention, an adapter is provided whereby air from a tank can be provided via the adapter to the air intake of an internal combustion engine driving a firefighter's tool while at the same time, air from the same tank is provided to the firefighter's breathing apparatus. In a specific embodiment hereinafter described in detail, the adapter comprises a metal body defining an air plenum with two sides, one side having an aperture adapted for twist-to-lock connection to a demand valve for a supply of compressed air and the other side being adapted for direct connection to the air intake of an internal combustion engine driving a firefighter's appliance or tool.

As used herein, the term "demand valve" shall be taken to refer to a valve which opens to permit the flow of air from a supply source such as a tank of compressed air whenever a demand for that air to a downstream air user is needed. The demand valve may be part of a regulator or separate from a regulator. The regulators described herein include demand valves.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter being briefly described hereinafter.

BRIEF SUMMARY OF THE DRAWINGS

The description herein makes reference to the accompanying drawings wherein like reference numerals refer to like parts throughout the several views and wherein.

DETAILED DESCRIPTION OF THE PREFERRED EMBODIMENT

Figure 1:
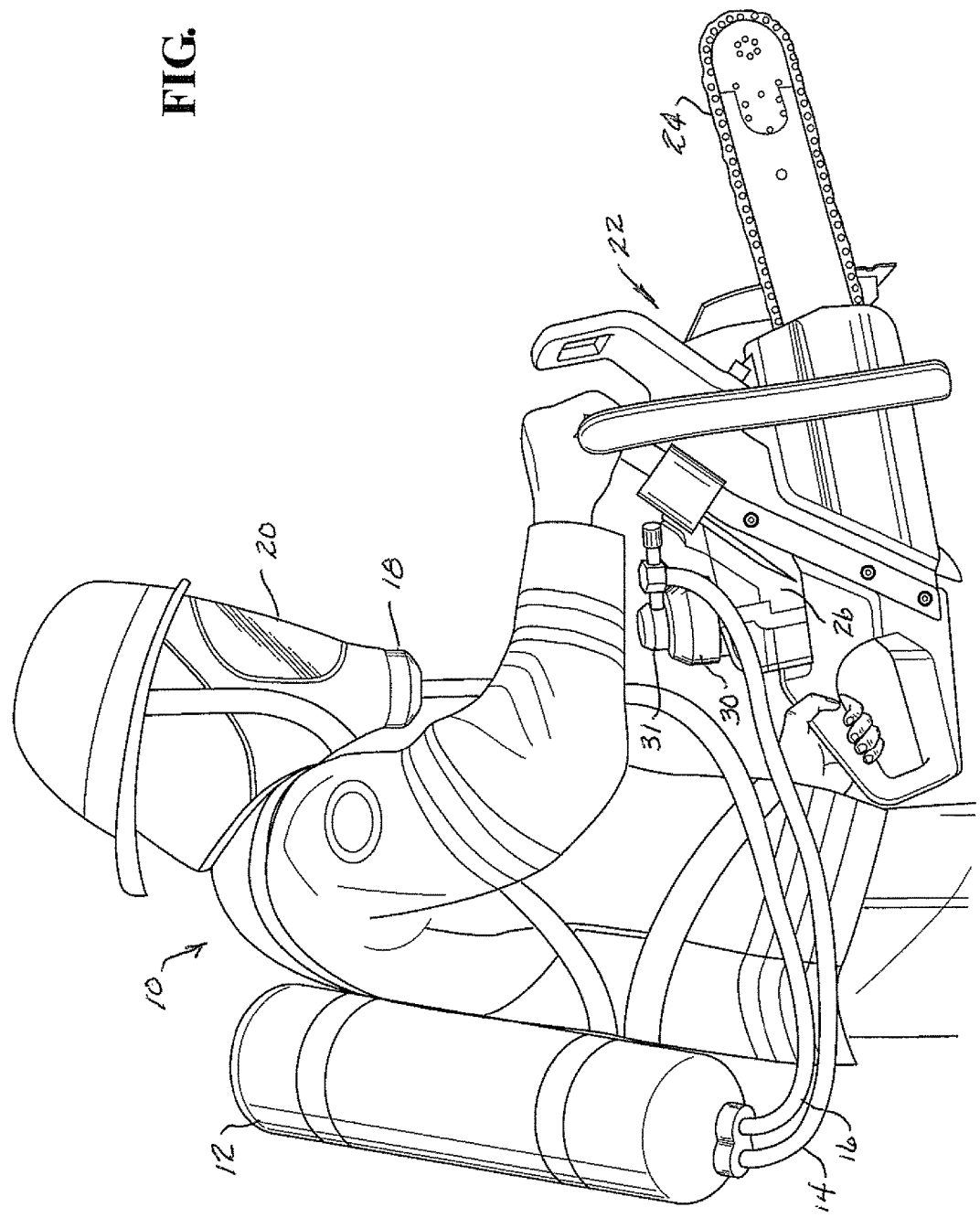
FIG. 1 is a view of a firefighter equipped with a double-outlet compressed air tank, a personal breathing apparatus and an appliance in the form of a chainsaw driven by an internal combustion engine.

Referring now to the figures, FIG. 1 shows a firefighter 10 in full dress carrying on his back a compressed air tank 12 having two parallel outlet/supply conduits 14, 16 of which the conduit 16 is connected to supply air to a demand-type regulator 18 associated with a personal breathing apparatus including a mask 20 worn by the firefighter 10. The mask 20 is of the type having a clear Plexiglas viewing pane and of sufficient size to cover the entire face of the firefighter. Although not shown, the mark may incorporate a microphone and earpiece or speaker so that the firefighter can communicate with other firefighters or a director at the scene of operations.

Figure 2:
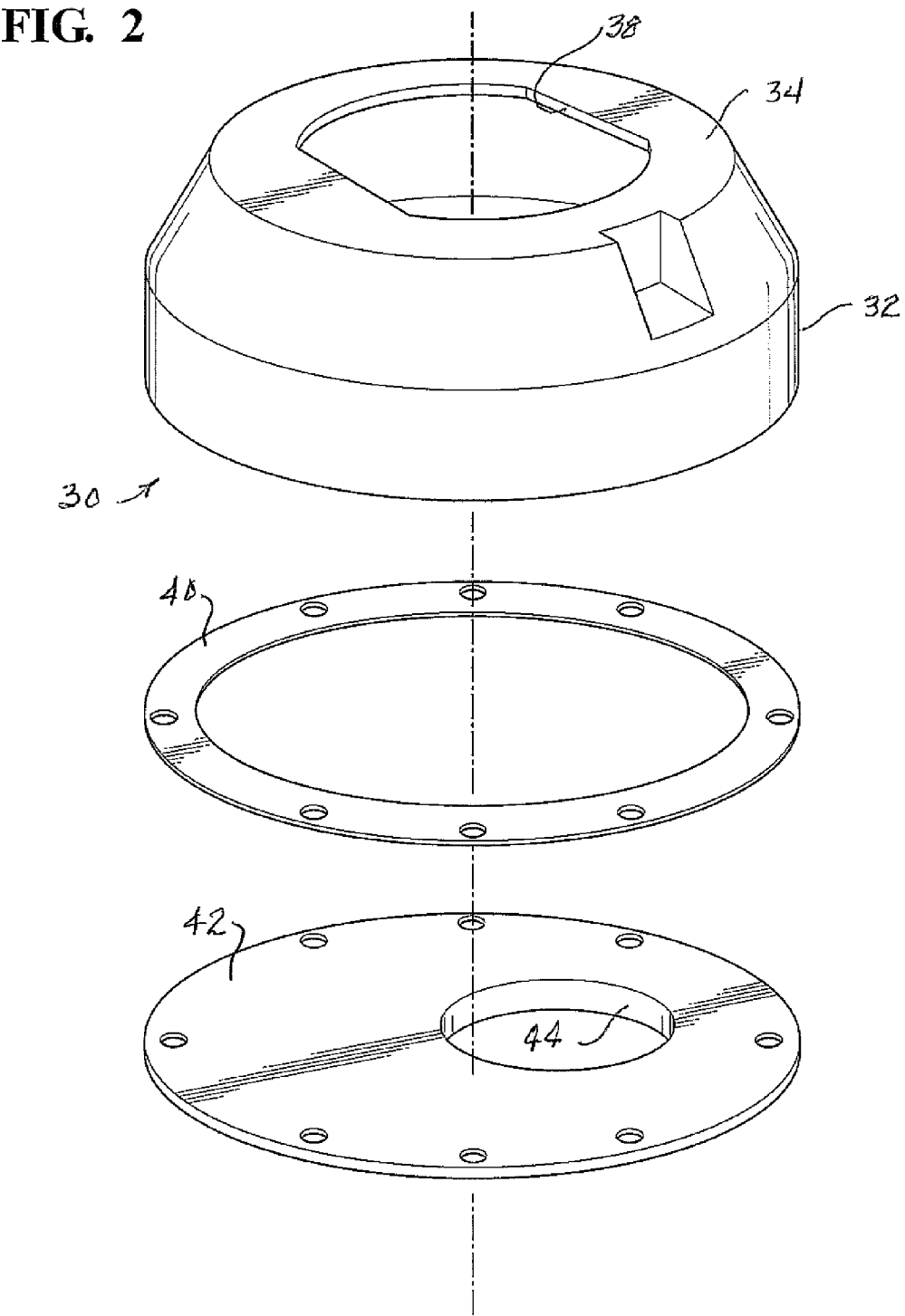
FIG. 2 is an exploded perspective view of an adapter used in the system of FIG. 1 to supply air from the compressed air tank on the firefighter's back to the air intake of an internal combustion engine driving the chainsaw.
Figure 3:
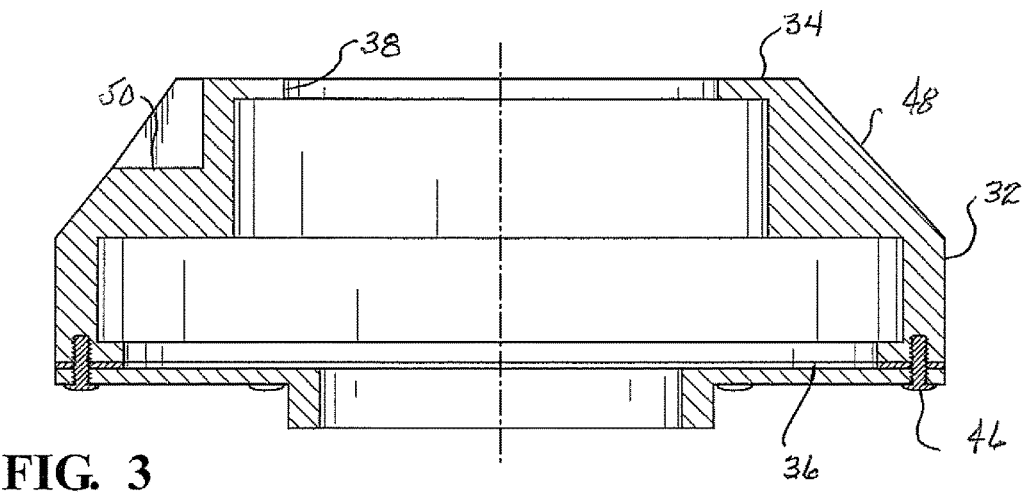
FIG. 3 is a cross-sectional view of the adapter of FIG. 2.

As further shown in FIG. 1, the firefighter is carrying an appliance in the form of a chainsaw 22 having a cutter bar 24 driven by an internal combustion engine 26. The engine 26 has a cylindrical air intake 28, best shown in FIG. 6. An adapter 30, more fully described with reference to FIGS. 2 and 3, is mounted on the air intake 28 in such a way as to receive a demand valve regulator 31 which is connected to the second of the two parallel supply conduits 14, 16 as shown. As a result, the compressed air tank 12 is capable of supplying air to the breathing apparatus including regulator 18 worn by the firefighter 10 as well as to the internal combustion engine 26 driving the cutter bar 24 of the chainsaw 22. Both regulators 18, 31 include demand valves which are respectively activated by the normal breathing function of the firefighter 10 and the air pumping action produced by the internal combustion engine of the chainsaw 22.

Figure 7:
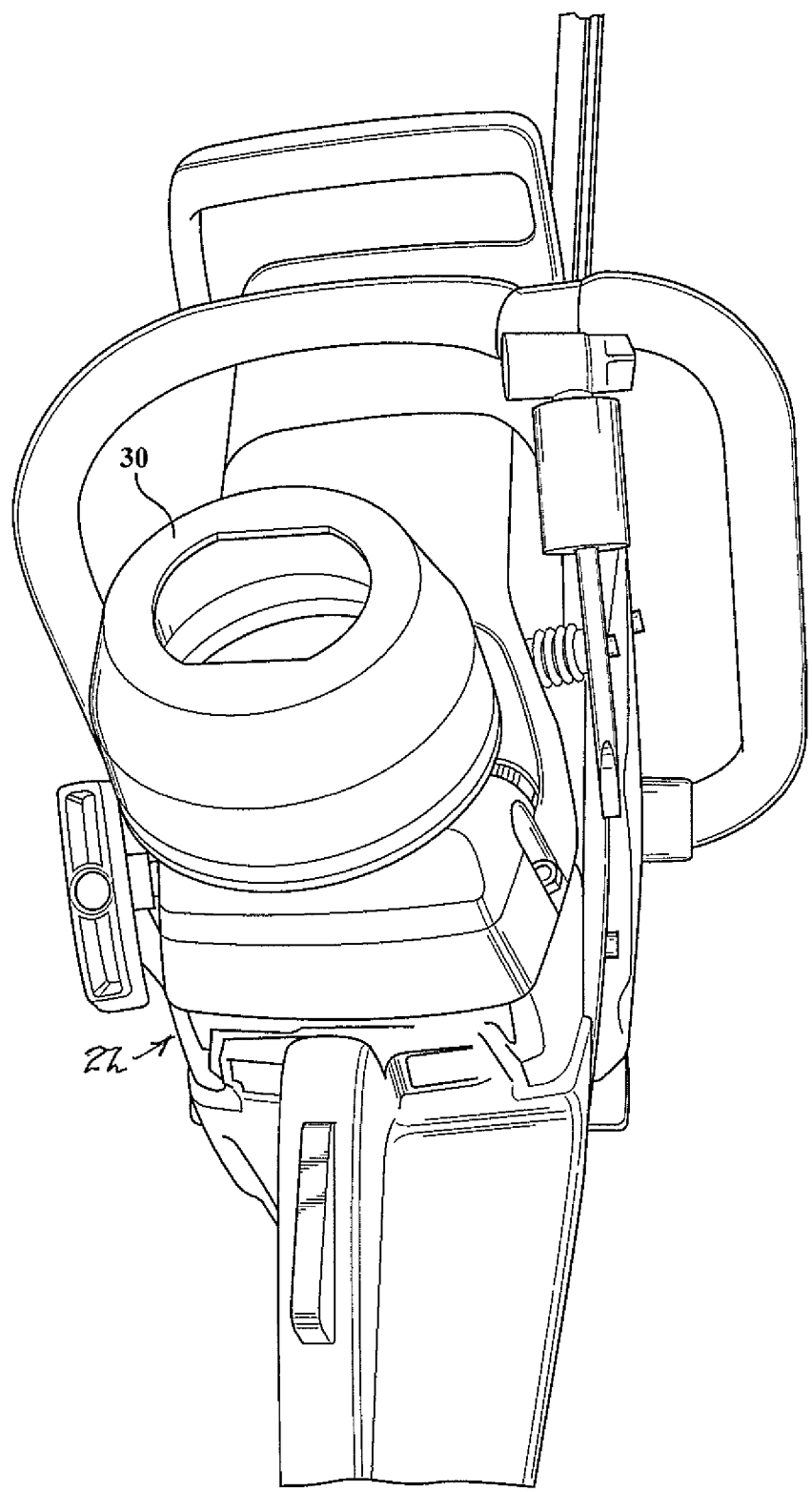
FIG. 7 is a drawing of the top of the chainsaw with the adapter mounted to the air intake.
Figure 8:
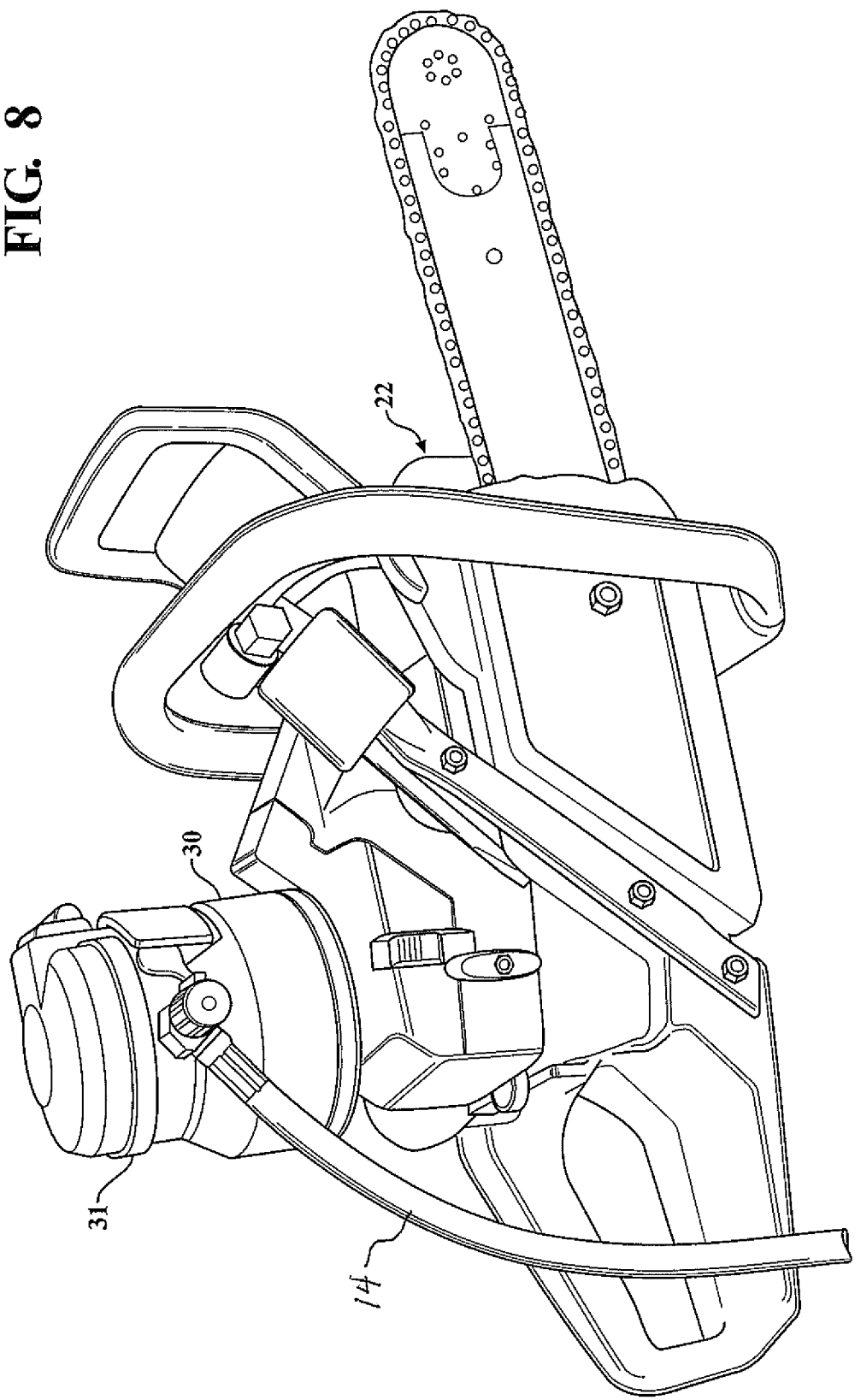
FIG. 8 is a drawing of the chainsaw with the adapter attached to the air intake of the internal combustion engine and an air supply conduit and regulator attached to the top side of the adapter.

Referring now to FIGS. 2 and 3, the adapter 30 is shown to comprise a generally cylindrical aluminum body 32 having an open interior defining an air plenum having a top wall 34 and a bottom wall 36, both of which are open to permit air to flow through the adapter 30. The top wall is shown to have a shaped aperture 38 specifically configured to receive and lockingly attach to the regulator 31 which receives air from the tank 12 by way of the conduit 16, as best shown in FIGS. 7 and 8. A conventional twist-to-lock connection is intended. The bottom wall 36 has a large cylindrical opening and is flat so as to bear against a seal ring or gasket 40 and a circular plate 42 having an offset external collar 44, with an inside diameter that matches the outside diameter of the air intake cylinder 28 of the internal combustion engine driving the chainsaw 22. The plate 42 and gasket or seal ring 40 are attached to the bottom side of the adapter 30 by means of screws 46 as best shown in FIG. 3. The collar 44 is secured to the air intake by a clamp 45.

Figure 6:
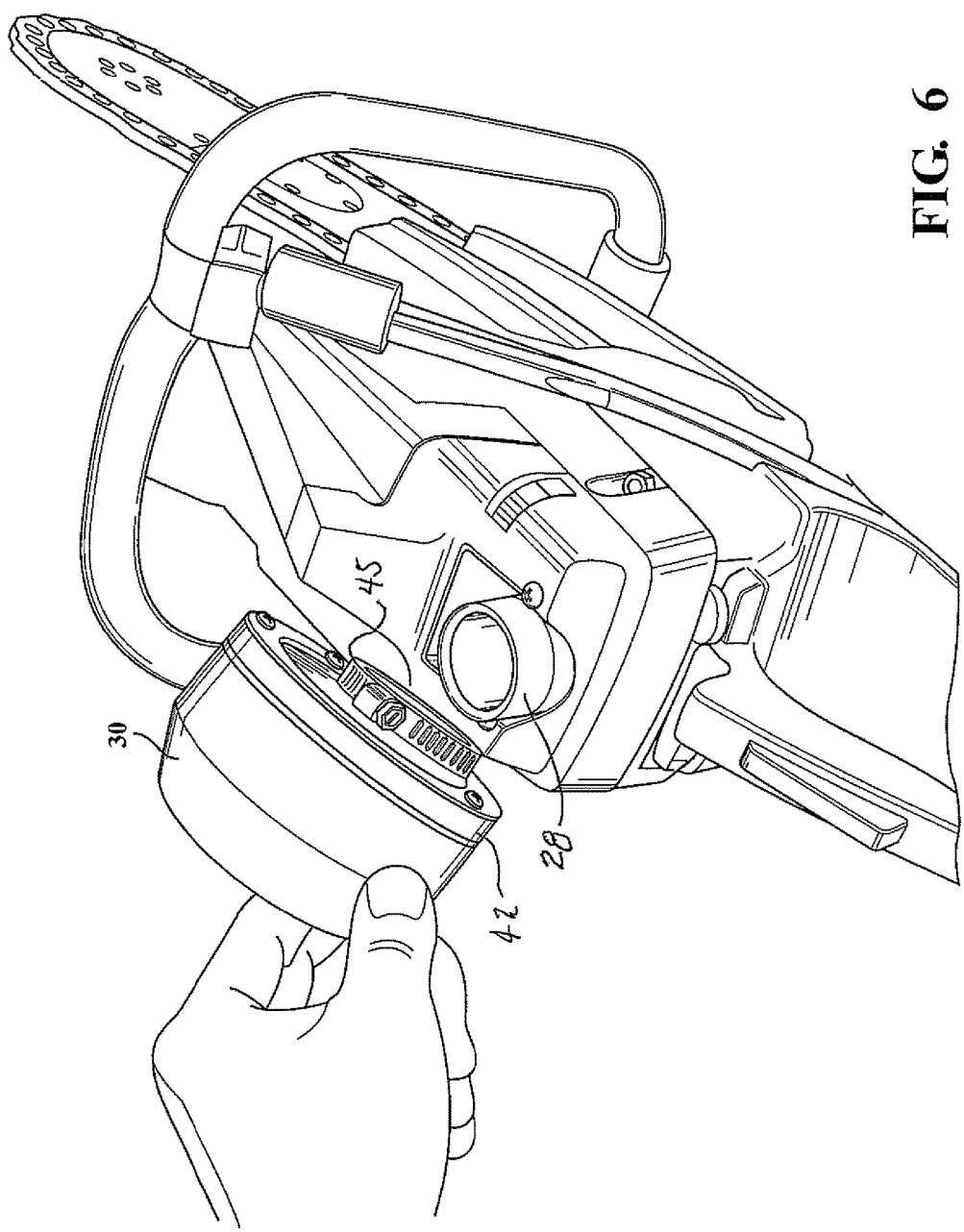
FIG. 6 is a drawing of the top of a chainsaw showing the air intake for an internal combustion engine with the adapter of FIG. 2 about to be placed on the air intake.

FIG. 6 shows the chainsaw air intake 28 with the normal air filter removed so as to permit the adapter 30 to be put in place as shown in FIGS. 7 and 8. It may be held securely in place by means of a clamp 45 that encircles the combination of the collar 44 and the outside diameter of the air intake 28.

The adapter 30 has a tapered or beveled upper outside surface 48 which is notched at 50 to provide clearance for a latch on the regulator 31. This is a representative drawing as the adapter 30 may be variously configured to meet the needs of a particular appliance, whether it be a chainsaw, circular saw or other internal combustion engine-driven firefighter's tool. The apertures defined by the collar 44 and the cutout 38 in the adapter 30 may be aligned or offset, also as needed to match the configuration of the appliance to which the adapter is attached; i.e., it is the collar 44 which is normally off-center relative to the aperture 38 which receives the regulator 31.

Figure 4:
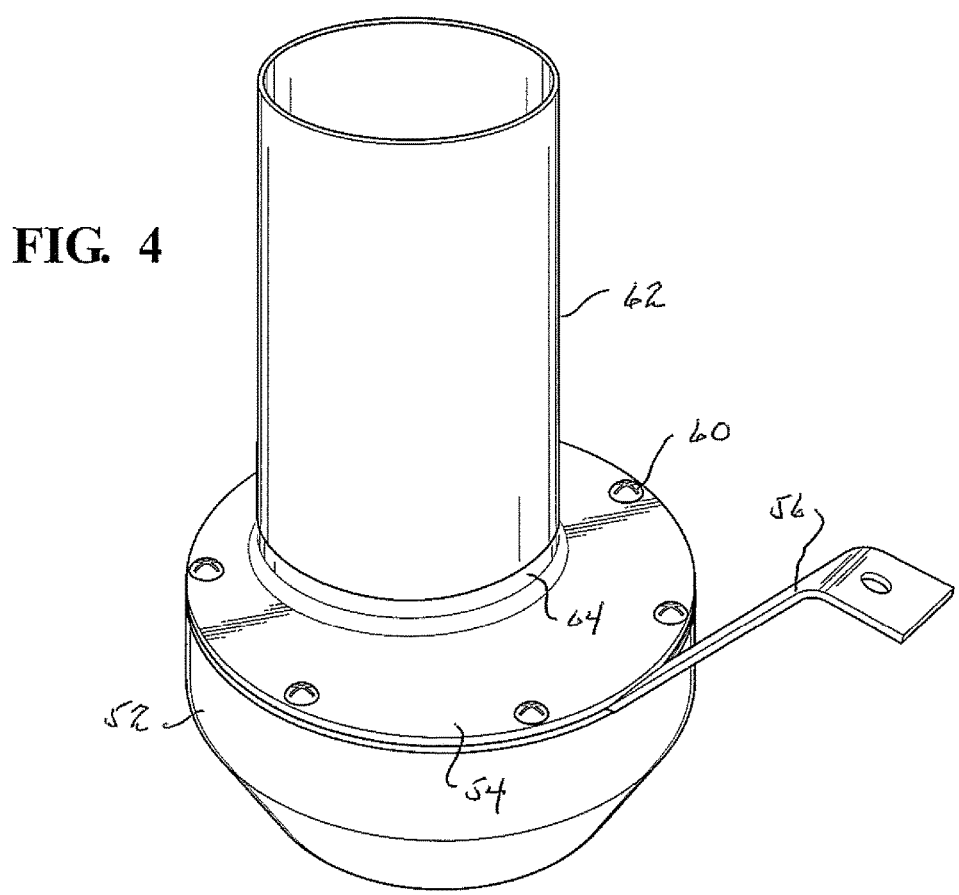
FIG. 4 is a perspective drawing of an alternative adapter embodiment.
Figure 5:
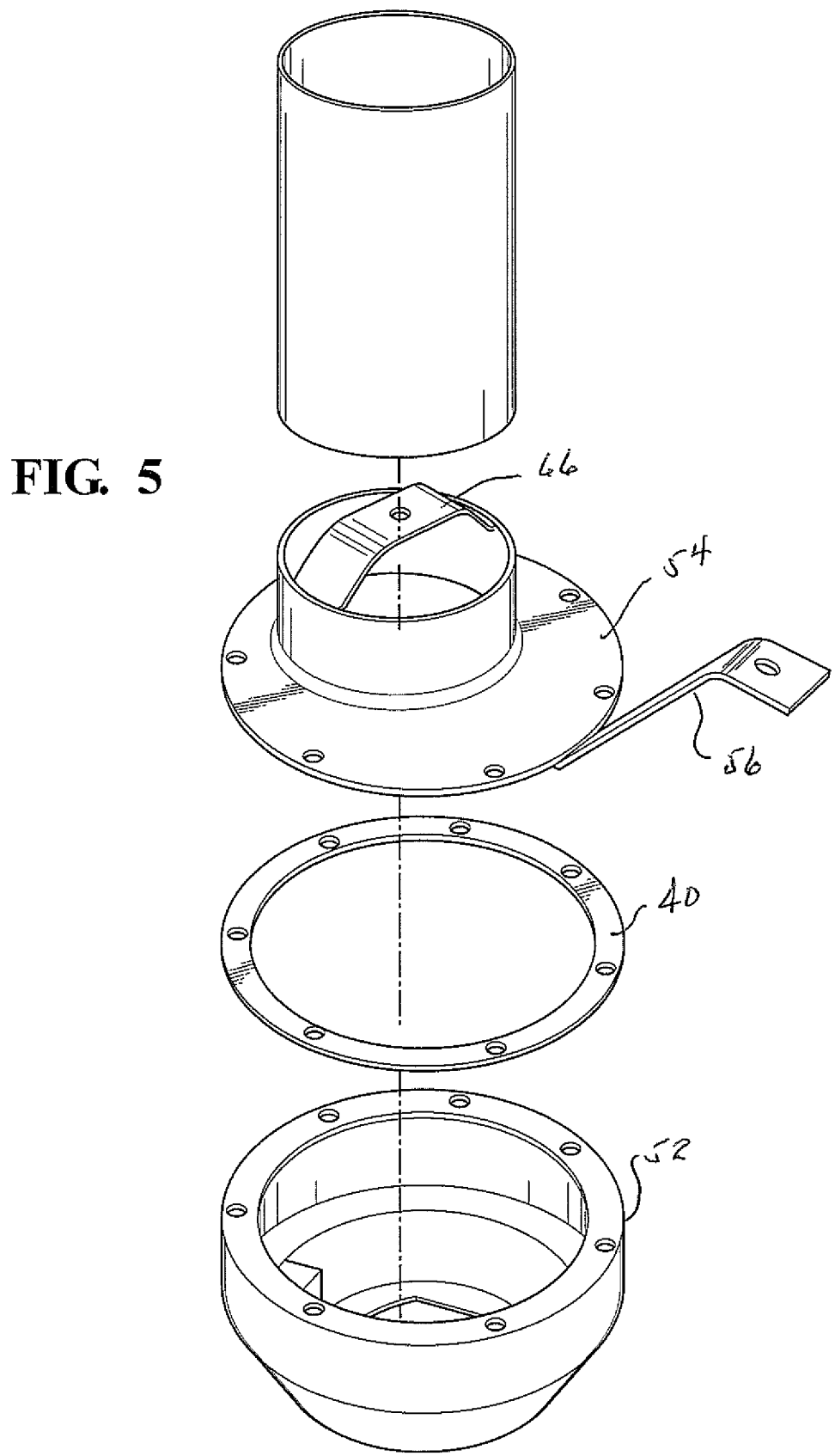
FIG. 5 is an exploded view of the adapter of FIG. 4.

FIGS. 4 and 5 show an alternative adapter comprising a body 52 which is substantially identical to the body 32 of the adapter shown in FIGS. 2 and 3; however, the plate 54 is configured to show an offset outlet collar 64, to which is attached a cylindrical tube 62 for attachment to the air intake of the appliance, such as the chainsaw 22. The tube 62 allows the adapter 52 to stand off of the upper surface of the appliance by a distance of several inches. In this case, an appendage in the form of an aluminum arm 56 is attached such as by welding to the plate 54 to stabilize the adapter body 52 relative to the body of the chainsaw. Screws 60 attach to the plate 54 to the adapter body 52 in a fashion similar to the use of the screws 46 in the embodiment of FIG. 3. A metal strap 66 is welded across the inside diameter of collar 64 to allow attachment of the tube 62.

In normal operation, the firefighter 10 dons his or her uniform including the personal breathing apparatus provided by the mask 20 and demand regulator 18 and makes sure before entering into the air/oxygen-deprived area that the regulator 18 is properly connected by way of the conduit 14 to the tank 12 and that the tank 12 is providing air in a normal fashion. The firefighter then attaches the adapter 30 with the regulator 31 to the chainsaw 22 and starts the chainsaw either before entering the operational venue or after, the action of starting the chainsaw, usually by way of a pull cord, operates the demand valve in the regulator 31 so as to start the flow of air by way of conduit 16 to the chainsaw 22 allowing it to operate to substantially full capacity and power.

Simultaneous use of air from the tank 12 by both the firefighter 10 and the appliance 20 naturally causes a more rapid depletion of the air in the tank 12. Thus, for safety purposes, the firefighter 10 is obligated to monitor the remaining air supply carefully and exit the operational venue and/or terminate operation of the chainsaw when the indicated air supply runs low.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A firefighter's apparatus comprising: a cutting tool having an internal combustion engine with a circular air intake for combustion air; an adapter mounted on the air intake, the adaptor including a generally cylindrical metal body defining an air plenum having a top side and a bottom side, the top side having an aperture formed therein and configured to lockingly receive a first demand valve-type regulator and the bottom side having a plate with an offset external collar extending a distance away from the plate configured to mate with the air intake, the generally cylindrical metal body having a tapered upper outside surface that extends to the bottom side, said bottom side being coupled by fasteners to said plate for attachment of said offset collar to said circular air intake; the first demand valve-type regulator being configured to be fed by a breathable compressed air supply; a personal breathing apparatus that includes a mask configured to cover the face of the firefighter and adapted to be worn by a firefighter while using said cutting tool in a fire fighting venue; a second demand valve-type regulator disposed on a lower portion of the mask and configured to be fed by the breathable compressed air supply; the breathable compressed air supply having first and second supply conduits, one of the first and second supply conduits being attached to supply air to the air intake through the first demand valve-type regulator and said topside aperture, and the other of the first and second supply conduits being connected to the second demand valve-type regulator for supplying air to the personal breathing apparatus, wherein the first demand valve-type regulator is configured to allow air to flow to the air intake when the cutting tool is started.

2. The apparatus of claim 1, wherein the cutting tool is a chainsaw.

3. The apparatus of claim 1, wherein the cutting tool is a circular saw.

4. The apparatus of claim 1, wherein the generally cylindrical metal body of the adaptor includes a generally cylindrical aluminum body.

5. The apparatus of claim 1, wherein the adaptor is configured to replace an air filter associated with the air intake.

6. The apparatus of claim 1, wherein the bottom side of the adaptor includes a cylindrical tube attached to the plate that is configured to mate with the air intake and to provide a distance between the adaptor and the cutting tool.

7. The apparatus of claim 6, wherein the adaptor includes an appendage attached to the plate that is configured to be attached to the cutting tool to stabilize the adaptor.

* * * * *